(12) United States Patent
Westerwaal Gheorghe et al.

(10) Patent No.: US 11,060,394 B2
(45) Date of Patent: Jul. 13, 2021

(54) APPARATUS AND METHOD FOR DOWNHOLE MEASUREMENT

(71) Applicant: SHELL OIL COMPANY, Houston, TX (US)

(72) Inventors: Diana Westerwaal Gheorghe, Rijswijk (NL); Jan-Jette Blangé, Rijswijk (NL); Paul Anthony Donegan McClure, Aberdeen (GB)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 16/961,485

(22) PCT Filed: Jan. 8, 2019

(86) PCT No.: PCT/EP2019/050331
§ 371 (c)(1),
(2) Date: Jul. 10, 2020

(87) PCT Pub. No.: WO2019/137908
PCT Pub. Date: Jul. 18, 2019

(65) Prior Publication Data
US 2020/0340354 A1   Oct. 29, 2020

(30) Foreign Application Priority Data
Jan. 10, 2018 (EP) .................................... 18150953

(51) Int. Cl.
*E21B 47/053*   (2012.01)
*E21B 45/00*    (2006.01)
*G01V 5/08*     (2006.01)

(52) U.S. Cl.
CPC ............ *E21B 47/053* (2020.05); *E21B 45/00* (2013.01); *G01V 5/08* (2013.01)

(58) Field of Classification Search
CPC ........ E21B 45/00; E21B 47/111; E21B 47/11; E21B 47/053
See application file for complete search history.

(56) References Cited

U.S. PATENT DOCUMENTS 5,818,352 A * 10/1998 McClure ................. E21B 47/13
                                                    340/854.6
7,804,060 B2 * 9/2010 Guo ........................ G01V 5/104
                                                    250/269.4
(Continued)

FOREIGN PATENT DOCUMENTS

EP   2045440 A2   4/2009

OTHER PUBLICATIONS

International Search Report and Written Opinion received for PCT Patent Application No. PCT/EP2019/050331, dated Feb. 22, 2019, 08 pages.
(Continued)

*Primary Examiner* — Shane Bomar

(57) ABSTRACT

An apparatus and method for downhole measurement during operation of a drilling system is disclosed. The apparatus (30) comprises: a first sensor (302) configured to detect a property of a subsurface formation (200); a radiation source (304) configured to, when triggered, emit radiation to excite a part (220) of the formation; a processing unit (308) configured to trigger the radiation source if a change of the property of the formation is detected; a second sensor (306) positioned at a known distance from the radiation source and operably connected to the processing unit, the second sensor is configured to detect said excited part of the formation and is more distant from a drill bit (104) of the drilling system than the radiation source is; the processing unit is further configured to, after the excited part of the formation is detected, calculate a rate of penetration of the drill bit based on the following: a time duration between the radiation (Continued)

source is triggered and the excited part of formation is detected, and the distance between the radiation source and the second sensor.

15 Claims, 4 Drawing Sheets

(56) References Cited

U.S. PATENT DOCUMENTS

| | | | |
|---|---|---|---|
| 9,261,622 B2* | 2/2016 | Inane | G01V 5/101 |
| 10,132,158 B2* | 11/2018 | Hay | E21B 47/024 |
| 2002/0195276 A1 | 12/2002 | Dubinsky et al. | |
| 2006/0015257 A1 | 1/2006 | Hassan et al. | |
| 2009/0266609 A1* | 10/2009 | Hall | E21B 47/00 |
| | | | 175/45 |
| 2011/0060527 A1* | 3/2011 | Teodorescu | E21B 45/00 |
| | | | 702/9 |
| 2012/0043966 A1* | 2/2012 | Montaron | G01V 5/104 |
| | | | 324/324 |
| 2013/3041091 | 12/2013 | Sugiura | |
| 2014/0343856 A1* | 11/2014 | Zhou | E21B 47/11 |
| | | | 702/8 |
| 2015/0240623 A1 | 8/2015 | Blange et al. | |
| 2016/0327680 A1 | 11/2016 | Jain | |
| 2019/0169986 A1* | 6/2019 | Storm, Jr. | G01V 1/50 |

OTHER PUBLICATIONS

Adams et al., Bayesian Online Changepoint Detection, eprint arXiv:07103742, Oct. 19, 2007, 7 pages.

\* cited by examiner

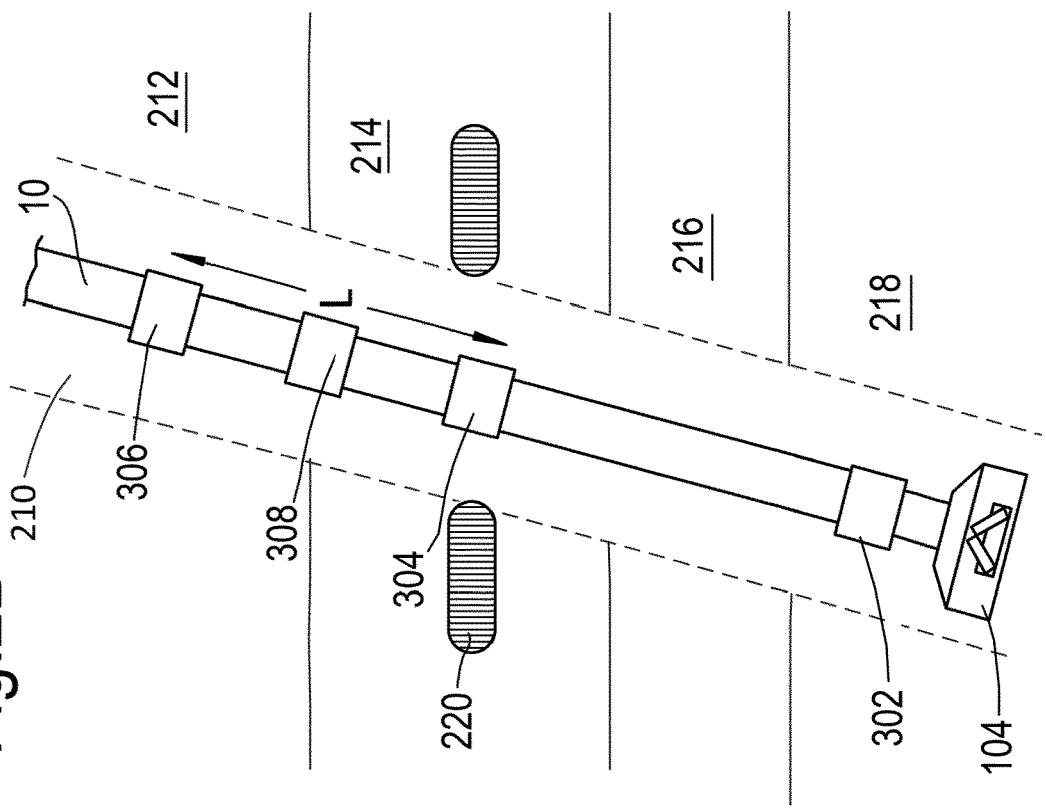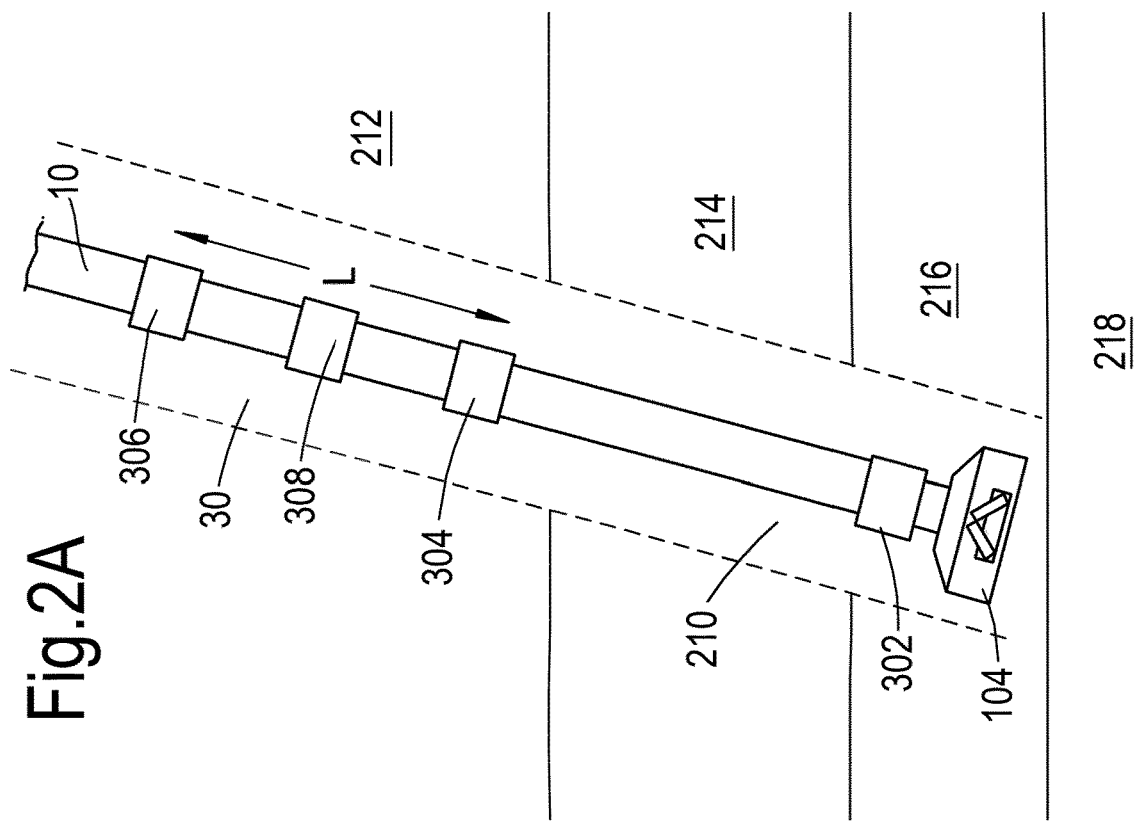

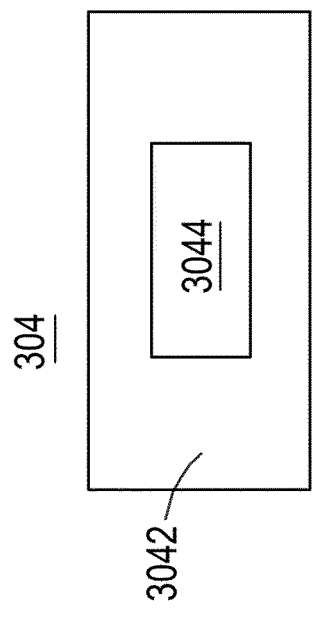
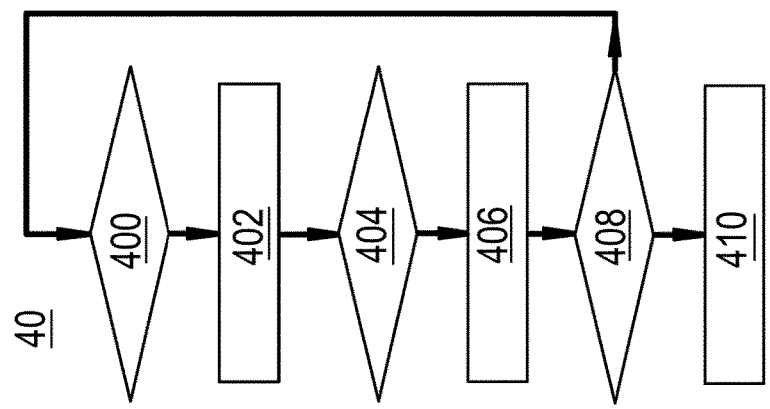
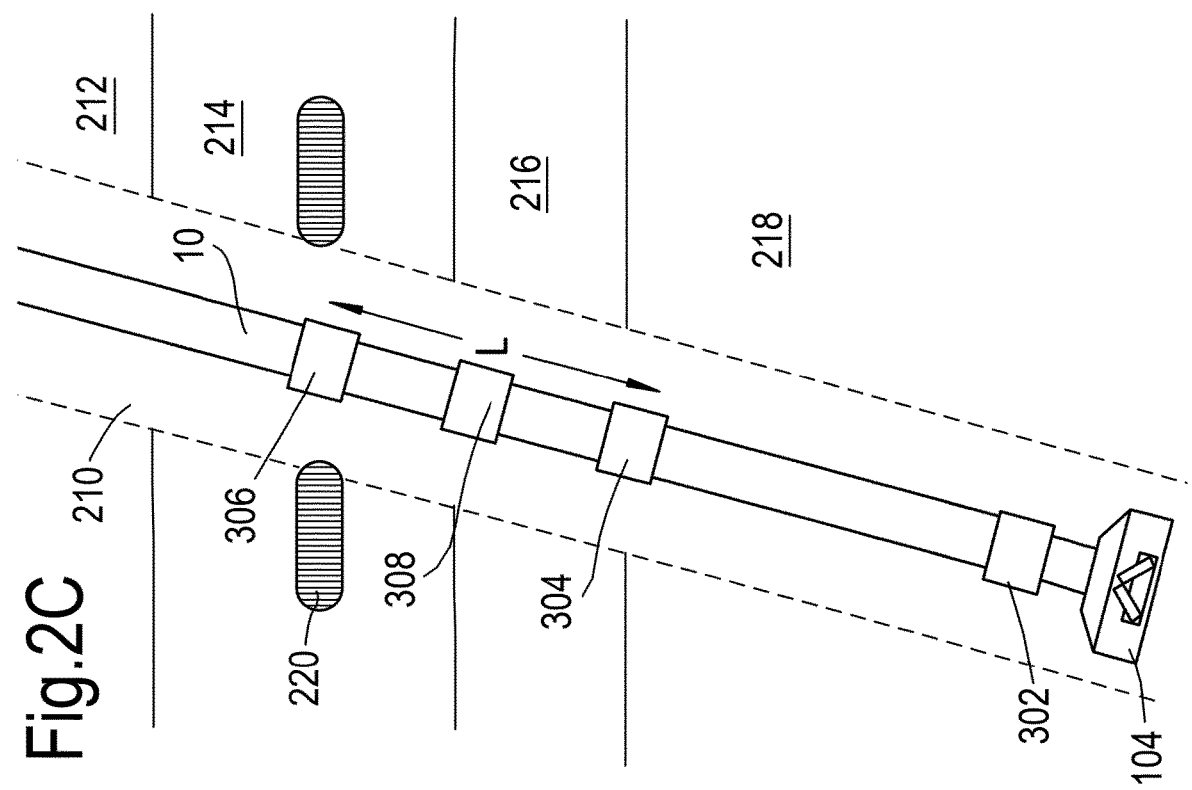

US 11,060,394 B2

APPARATUS AND METHOD FOR DOWNHOLE MEASUREMENT

CROSS REFERENCE TO RELATED APPLICATION

The present application is a US national stage application of International application No. PCT/EP2019/050331, filed 8 Jan. 2019, and claims benefit of priority of European application No. 18150953.0 filed 10 Jan. 2018.

TECHNICAL FIELD

The present invention relates to an apparatus and method for downhole measurement during operation of a drilling system.

BACKGROUND

Wellbores (also referred to as boreholes) are usually drilled with a drill string that includes a tubular member having a bottom hole assembly ("BHA"). The BHA has a drill bit attached to the bottom end thereof. The drill bit is rotated to disintegrate the subsurface formations to drill the wellbore. The BHA typically includes devices for providing parameters relating to the behavior of the BHA, parameters of the formation surrounding the wellbore and parameters relating to the drilling operations.

Rate of penetration (ROP) of the drill bit depends on several factors including the design of the drill bit, rotational speed (or rotations per minute or RPM) of the drill bit, weight-on-bit, type of the drilling fluid being circulated through the wellbore and the rock type of the formation. A high ROP is usually desirable because it reduces the overall time required for drilling a wellbore. A low ROP however, could typically extend the lifetime of the drill bit and the BHA.

To enable full drilling automation and a better control of wellbore trajectory, it is desirable to develop the ability to determine ROP directly downhole.

US 2016/0327680 A1 discloses a system and method for making downhole measurements using a neutron source to create a marker in an underground formation, a nuclear radiation detector to detect gamma and/or other nuclear radiation emitted by the marker and a downhole drilling progress monitoring unit which generates real time information about incremental depth and/or associated ROP of an automated or other drilling assembly based on detection of the nuclear radiation and an axial distance L between the neutron source and the nuclear radiation detector without requiring transmission of the real time incremental depth and/or ROP data to surface equipment via a complex wired or wireless data transmission system.

According to the system and method described in US 2016/0327680 A1, the neutron source and two gamma sensors need to be placed close to the drill bit, so as to quickly detect changes in the formation. However, a BHA usually only has very limited space especially in close proximity of the drill bit. Therefore, operators may not be able to place the neutron source and the sensors close enough to the drill bit, which leads to a delay in detection of the changes in the formation.

SUMMARY OF THE INVENTION

In an aspect of the invention, there is provided an apparatus for downhole measurement during operation of a drilling system, the apparatus comprising: a first sensor configured to detect a property of a subsurface formation; a radiation source configured to, when triggered, emit radiation to excite a part of the formation; a processing unit operably connected to the first sensor and the radiation source, the processing unit is configured to trigger the radiation source if a change of the property of the formation is detected; a second sensor positioned at a known distance from the radiation source and operably connected to the processing unit, the second sensor is configured to detect said excited part of formation and is more distant from a drill bit of the drilling system than the radiation source is; the processing unit is further configured to, after the excited part of formation is detected, calculate a rate of penetration of the drill bit based on the following: a time duration between the radiation source is triggered and the excited part of formation is detected, and the distance between the radiation source and the second sensor.

There is also provided a drilling system comprising the aforementioned apparatus.

In another aspect of the invention, there is provided a method for downhole measurement during operation of a drilling system, comprising the following steps: detecting a property of a subsurface formation; determining if a change of the property of the formation is detected; if a change of the property of the formation is detected, triggering a radiation source to emit radiation to excite a part of the formation; detecting said excited part of formation with a sensor which is positioned at a known distance from the radiation source and is more distant from a drill bit of the drilling system than the radiation source is; calculating a rate of penetration of the drill bit, after the radiation tag is detected, based on the following: a time duration between the radiation source is triggered and the excited part of formation is detected, and the distance between the radiation source and the sensor.

BRIEF DESCRIPTION OF DRAWINGS

The invention will be described herein below in more detail, and by way of example, with reference to the accompanying drawings in which:

FIG. 2A-2C are plan views illustrating the apparatus for downhole measurement at different moments in time during operation of the drilling system.

FIG. 3 shows a schematic block diagram of a radiation source.

FIG. 4 shows an exemplary flowchart of a method for downhole measurement during operation of a drilling system.

Figure 1:
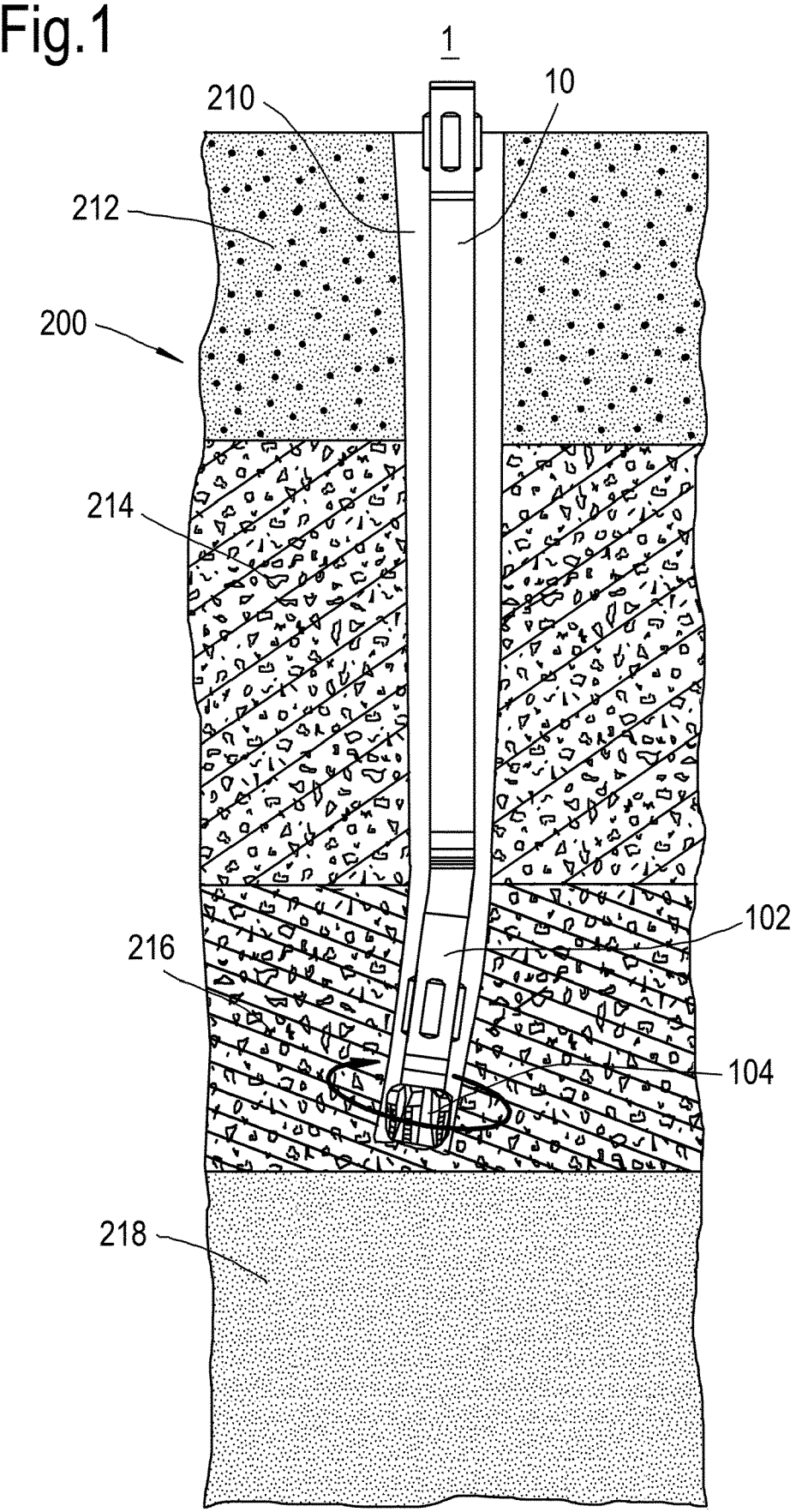
FIG. 1 illustrates a cross-sectional side view of a borehole showing a drilling system advancing in a formation.

In the drawings, similar reference signs refer to similar/equivalent components, steps or features.

DETAILED DESCRIPTION OF EMBODIMENTS

Wellbores for the production of water, oil or gas from a subsurface formation are generally drilled using a drill string. The drill string typically comprises a series of interconnected drill pipe sections. A downhole end of the drill string includes a BHA with sections of heavier drill collar to provide weight on bit, measuring while drilling (MWD)

equipment, and a drill bit at the downhole end thereof for crushing the formation. A drilling rig at surface for holding the drill string is provided with a drive system for rotating the drill string, typically including a top drive or other rotary table.

FIG. 1 illustrates a cross-sectional side view of a wellbore showing a drilling system. The drilling system 1 may be a directional drilling system using Rotary Steerable Systems (RSS), suitable for vertical and non-vertical wells. A person skilled in the art would appreciate that the apparatus and method according to the invention can be used regardless of the type of drilling system used, or whether the wellbore to be drilled is vertical or non-vertical.

The system 1 includes a drill string 10. The drill string 10 includes a BHA 102 which has a drill bit 104. Other elements/parts which are less relevant in this context and therefore omitted from the drawing for conciseness.

During operation of the drilling system 1, the drill string 10 advances in the subsurface formation 200 as the drill bit 104 rotates, thereby forming a wellbore 210 for producing water, hydrocarbon or any other resources from one or more layers of the formation.

FIG. 1 shows four formation layers 212, 214, 216 and 218. At that moment of time shown in FIG. 1, the drill bit 104 is in layer 216 and is drilling towards a deeper layer 218. Certain properties of the formation, such as radiation (e.g., gamma ray), sound velocity, formation density, may vary from one layer to another and sometimes even vary within one formation layer. These properties (hereinafter also referred to as formation properties) are associated with rock types which directly influence the ROP.

The drilling system 10 is provided with an apparatus for downhole measurement. The apparatus monitors changes of at least one of those properties, and derives/calculates a new ROP when said change is detected. The apparatus will be described in detail with reference to FIGS. 2A, 2B and 2C.

FIG. 2A-2C illustrate plan views of a bottom hole assembly operating in a subsurface formation at different moments in time. The apparatus 30 includes a first sensor 302, a radiation source 304, a second unit 306 and a processing unit 308. Some of these elements are operatively inter-connected for data/signal transmission if needed, as will be further described below. The way that these elements are connected may be selected according to the working condition in the wellbore and the connections may be wired or wireless. As will be further described, in an alternative example, the processing unit 308 may be implemented by two separated, simpler processors, the first processor is configured to receive measurement from the first sensor 302, determine if a change of the property is detected, and generate a trigger signal for e.g., the radiation source 304, the second processor is configured to calculate ROP.

The first sensor 302 is configured to detect a property of the formation. The property being detected/monitored may be one of the following: radiation, formation density or sound velocity. The first sensor 302 can therefore be implemented by a radiation (e.g. gamma ray) sensor, a formation density sensor or an sound velocity sensor. These properties are suitable because they are associated with rock types which directly influences the ROP. That is to say, when such a property changes, it means the rock type in which the drill bit is drilling has changed, so a new ROP needs to be calculated.

Weight-on-bit (WOB) and rotation round-per-minute (RPM) of the drill bit 104 may be taken into account to decide whether the first sensor 302 shall perform the detection. For example, when the WOB is low enough e.g., close to zero, and/or the RPM is low enough e.g., close to zero, the drill bit 104 is not advancing in the formation, meaning the rock property will not change. Hence, the first sensor 302 does not need to detect the formation property unless both WOB and RPM of the drill bit 104 increases, otherwise the first sensor 302 will continuously generate useless signal/data for the processing unit 308 which has a relatively low processing capability.

In order to quickly detect a change of formation property while the drill bit advances, the first sensor 302 is preferably placed close to the drill bit 104. Some existing drilling systems have a gamma ray sensor in the BHA. The apparatus 30 may use that gamma ray sensor as the first sensor 302 to take advantage of an already existing capability. Without loss of generality, in the following description, the first sensor is described as a gamma ray sensor which detects gamma ray, for example the strength of gamma ray, in the formation as the property of the formation, and a trigger signal will be provided to the radiation source (and the second sensor) if a change of gamma ray radiation is detected.

A signal indicating the detected gamma ray is sent from the first sensor 302 to the processing unit 308.

The processing unit 308 is configured to process the signal from the first sensor 302, in order to determine if a change of gamma ray is detected.

Different formation layers often have different rock types, and thus have different gamma ray emissions. Rock type within one formation layer might also vary, resulting in possible changes of gamma ray such as fluctuations.

The processing unit 308 may use a programmable algorithm to determine whether a change of gamma ray is detected. Operators may set the sensitivity of this algorithm to control how sensitive the apparatus 30 is to changes of gamma ray. By setting a higher sensitivity, it is possible to make the apparatus 30 respond to smaller gamma ray changes such as fluctuations within one formation layer. In that case, the radiation source 304, the second sensor 306 may be more frequently triggered, generating more data for ROP calculation. Implementing the processing unit 308 by two separate processors might be useful because one of the processors can be used mainly for ROP calculation, while the other mainly processes gamma ray detection signals from the first sensor 302, processing capacity of each processor could be relatively limited due to downhole constraints, but still sufficient because the processing load is being shared.

At the moment in time $T_0$ shown in FIG. 2A, the first sensor 302 is in formation layer 216, and detecting gamma ray in that formation layer.

The drill bit 104 further advances in the formation, and at a later moment in time $T_1$, as shown in FIG. 2B, the first sensor 302 reaches formation layer 218 which presents a considerably different gamma ray emission comparing to formation layer 216, and a change of gamma ray will be detected.

As mentioned, the processing unit 308 triggers the radiation source when a change of gamma ray is detected. Therefore, a trigger signal will be provided to radiation source 304 at $T_1$, the radiation source 304 in turn emits radiation to excite a part 220 of the formation, which excited part can be later detected by the second sensor 306 trailing behind the radiation source 304. The part 220 is typically the part of formation surrounding the radiation source 304 when the radiation source 304 is triggered. The radiation source 304 may be a neutron source which releases a beam of neutrons when triggered. The neutrons hit the part 220 of formation and excite electronic transitions in the atoms forming the rocks in that part 220. Upon relaxation, gamma radiation is emitted by the atoms in part 220 that have been excited by the neutrons from the radiation source 304. The second sensor 306 is, in this example, configured to detect the excited part 220 of the formation by detecting said gamma radiation emitted by the excited atoms in part 220.

Alternatively, the second sensor 306 can be configured as a neutron sensor. Considering the flight time of neutrons is longer than that of gamma ray, neutrons released from the source 304 to the part 220 may still be detectable when the second sensor 306 gets close to the part 220. Detecting the neutrons is therefore an alternative way to detect the excited part 220.

Preferably, the radiation source 304 is more distant from the drill bit 104 than the first sensor 302 is.

The emission of radiation from the radiation source 304 may only last a very short period of time. After the emission, the radiation source is "turned off" again, and will be triggered again when the first sensor 302 detects another change of gamma ray. To operate the radiation source 304 on a trigger-basis, as shown in FIG. 3, it is proposed to shield the radiation source 304 from the first and second sensor, by a shield 3042 having a sliding window 3044. When the radiation source 304 gets triggered, the sliding window 3044 opens for a short time period to expose the part 220 of formation to the radiation. After emission of radiation, the window 3044 closes thereby "turns off" the radiation source 304. The radiation source 304 can be designed in a different way as deemed fit according to its applications. The duration during which the sliding window is kept open can be pre-set and tunable depending on type of formation layer, if necessary.

The drill bit 104 continues to drill down after $T_1$, and therefore the second sensor 306 gets closer and closer to the part 220. Finally, at moment in time $T_2$ as shown in FIG. 2C, the second sensor 306 gets close enough to the part 220 and picks up the radiation from the part 220. Note the gamma ray signal detected by the second sensor 306 may have two components: the gamma ray tag planted by the radiation source, and the background gamma ray radiation of the formation layer. The signal from the second sensor 306 may be sent to the processing unit 308 where the background gamma ray component can be removed using e.g. the gamma ray measurement from the first sensor 302 at $T_1$.

The second sensor 306 is positioned at a known distance L from the radiation source 304 along the axial direction of the drill string, and is operably connected to the processing unit 308. The second sensor 306 is more distant from the drill bit 104 than the radiation source is, in order to detect part 220 of the formation that has been excited by the radiation source 304. Preferably, the second sensor 306 may be triggered to perform the detection when a change of gamma ray is detected by the first sensor 302. The type of the second sensor 306 shall be selected according to the type of the radiation source, in order to detect the excited part 220. In case the radiation source 304 is a neutron source configured to emit neutrons, the second sensor 306 can be implemented by, for example, a gamma ray sensor. The distance L shall be selected taking into account the lifetime of the radiation from the excited part 220, in order to timely capture the radiation before it fades and becomes undetectable.

The processing unit 308 is further configured to, after the excited part 220 of the formation is detected by the second sensor 306, calculate a ROP of the drill bit 104 based on the following: a time duration T between the moment in time $T_1$ when the radiation source 304 is triggered and the moment in time $T_2$ when the excited part of formation is detected, and the distance L between the radiation source 304 and the second sensor 306, as defined in Equation (1):

$$ROP=L/T \qquad (1)$$

The processing unit 308 may be configured to use a latest ROP calculated until the radiation source 304 is triggered again and a new ROP is calculated.

The processing unit 308 may further calculate a depth of the drill bit 104 by integrating the calculated ROP over time. A latest ROP may be used for the depth calculation until a new ROP is obtained.

When one processing unit 308 is used, it may be positioned between the radiation source 304 and the second sensor 306, or elsewhere as needed.

As previously mentioned, the processing unit 308 may be implemented by two separate processors, the ROP calculation and the depth calculation may be performed at one of those processors, leaving the other processor mainly responsible for processing signals from the first sensor 302 and determining whether a change of gamma ray is detected. By separating the processing unit into two processors, it becomes possible to provide the radiation source 304, the second sensor 306 and the processor as an ensemble, if needed in practice. In an example, the whole ensemble may be activated when a change of gamma ray is detected, and remain idle otherwise.

Using the first sensor 302 close to the drill bit 104 to detect change of formation property, and triggering the radiation source 304 when a change of formation property is detected has the following benefits:

(1) ROP can be determined downhole in real time. This allows real-time closed loop control of the drilling assembly and makes the drilling assembly fully autonomous.

(2) The calculation of ROP and drill bit depth becomes more accurate, which in turn allows improved accuracy in wellbore trajectory control and well placement.

(3) The first sensor placed close to the drill bit allows quick detection of changes in the formation property and continuous monitoring of the property while drilling.

(4) The radiation source, the second sensor (and a separate processor for ROP calculation) can be placed anywhere along the drill string, preferably behind the first sensor, because the radiation source needs to be triggered by changes detected with the first sensor. In other words, the radiation source and the second sensor do not have to be close to the drill bit, or be accommodated in the BHA. This means the apparatus is suitable for those BHAs with very limited space in proximity of the drill bit. This also means the radiation source and the sensor can be kept away from harsh conditions near the drill bit, which may extend the lifetime of the radiation source and the second sensor.

(5) Some existing drill systems have a gamma ray sensor in the sensor package placed close to the BHA. The apparatus may use that gamma ray sensor as the first sensor to take advantage of an already existing capability. The apparatus may be implemented by installing an ensamble of the second sensor, the radiation source, and a processor to an existing drill string. The processor may be further connected to the first sensor if there is no available processor to process the gamma ray measurement from the first sensor.

(6) Due to various constraints, downhole signal/data processing capability is limited. The ensemble of the radiation source and the second sensor generate new data to be processed when a change of formation property is detected, the amount of data is suitable for downhole processing.

(7) Different from US 2016/0327680 A1, the apparatus and method of the present invention do not use signal correlations and time delays between signals from the sensors to determine ROP, but instead the time duration between a radioactive tag is planted into the formation by a radiation source and the tag is picked up by a sensor trailing behind the source.

In the following, algorithms used to determine whether a change of the property of formation is detected by the first sensor will be described. This is mainly relating to a processor/processing unit which receives gamma ray detection signals from the first sensor and determines whether a change of the gamma ray emission is detected.

"Bayesian Online Changepoint Detection" by Ryan Prescott Adams and David J. C. MacKay (eprint arXiv: 0710.3742, 19 Oct. 2007) describes a method for changepoint detection which is highly modular and the algorithm may be applied to a variety of types of data. This and some other methods may, in principle, be used for the purpose of processing signal from the first sensor and determine whether a change of formation property is detected, however, these methods need a lot of training data and are computationally intensive, and may not be a good fit for downhole measurement.

Applicant found it useful to develop a method to determine whether a change of formation property is detected based on CUSUM (CUmulative SUMs control). CUSUM is a sequential analysis technique developed by E. S. Page in 1954. It is selected due to its robustness and easiness to implement in a software for drilling assemblies, which do not have extensive signal processing capabilities.

The apparatus and method introduce the concept of CUSUM in the analysis of logging data, with the aim to monitor changes in formation properties and identify different lithologies. A change in the formation property such as gamma-ray is associated with a change in the slope of the CUSUM, which can be identified with a dedicated software algorithm. This analysis is not restricted to gamma-ray signals, but can be used for various types of downhole sensors. To improve sensitivity of the downhole measurement to formation properties, a possible embodiment may include spectral gamma ray sensors. The signal processing is done with complementary algorithms that capture both short term signal changes due to rock property variations within a given lithology, but also long-term variations, associated with different lithologies. The short-term signal analysis allows to calculate subtle ROP variations within a given formation, whereas the long-term signal analysis allows to calculate the average ROP within a given stratigraphic layer. For the calculation of the tool depth, an average ROP value is used. Once a statistically significant change in the signal from the first sensor is detected, the radiation source and the second sensor are activated/triggered. The depth of the drill bit can be evaluated based on the average value of the calculated ROP (for a given lithology) and the total time downhole.

The slope variation is in general more associated with the formation change other than noises from various sources. Optionally, the accuracy of the slope variation detection can be improved by signal processing (filtering, smoothing, etc.) prior to the calculation of a cumulative sum. In an example, a threshold value shall be pre-set for the slope variation detection, meaning the processing unit 308 provides that trigger signal to the radiation source 304 if a change of slope of the CUSUM curve exceeds that threshold value. This makes the system more reliable and accurate and less vulnerable to noise or other irrelevant event.

When monitoring/detecting gamma ray emissions in the formation, the first sensor 302 will generate discrete signals, represented by a raw data set.

The radiation source 304 may have additional trigger event in addition to the detection of change of formation property. For example, the radiation source 304 may, additionally, emit radiation to the formation on a regular basis (e.g., every several minutes). The second sensor 306 may detect the part of formation excited thereby, and a ROP may be calculated in the way as previously described. The apparatus and method is proposing a new idea to let the radiation source respond to detection of change of formation property, but is not limited to an embodiment where the radiation source is only triggered when a change of formation property has been detected. In practice, the radiation source may have additional trigger event(s).

Figure 5:
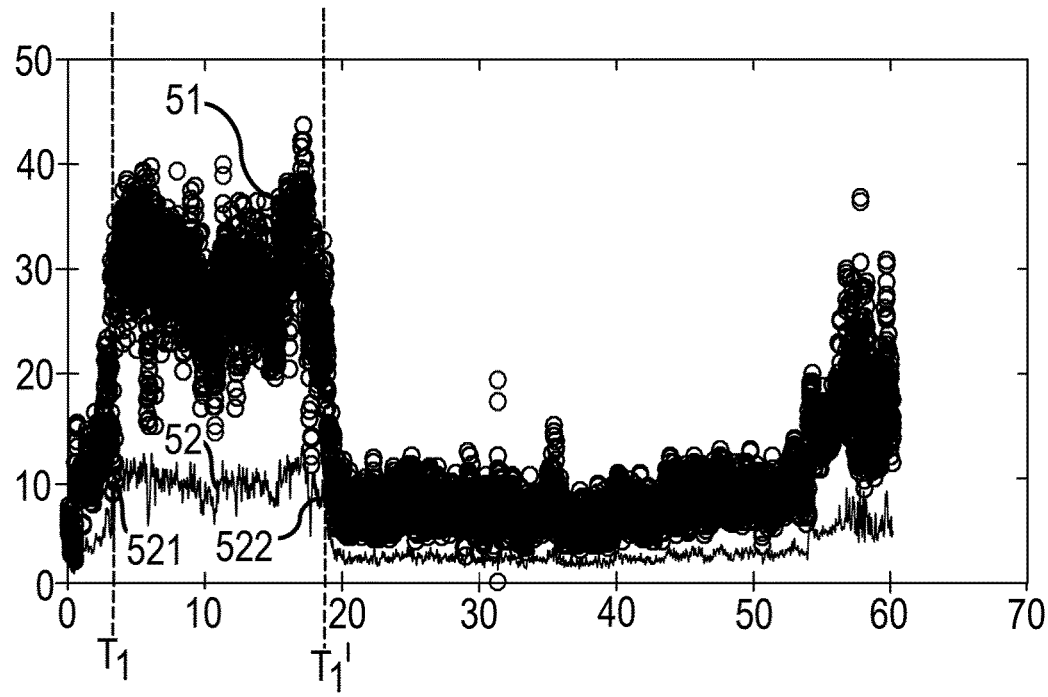
FIG. 5 illustrates gamma ray log obtained during field measurement.
Figure 6:
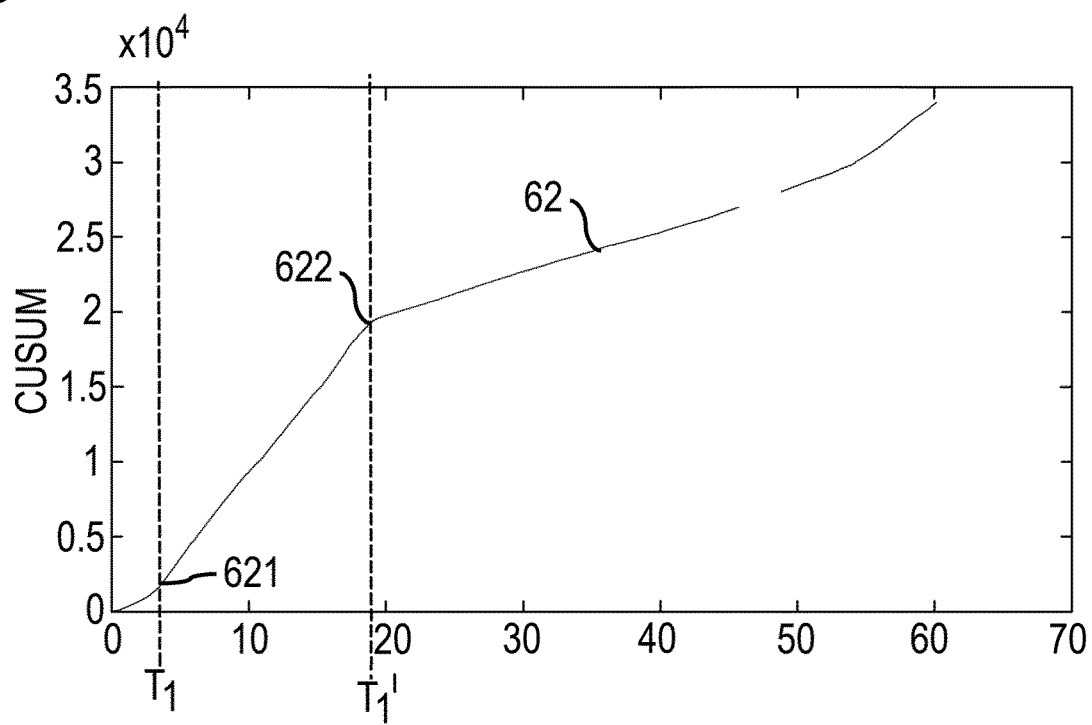
FIG. 6 illustrates a CUSUM curve of that gamma ray log in FIG. 5.

FIG. 5 illustrates a a gamma ray log obtained by a first sensor during field measurement. FIG. 6 illustrates a CUSUM curve of the log data shown in FIG. 5. The raw data log is shown as a discrete data set 51. The data set, after filtering, is illustrated by curve 52. From FIGS. 5 and 6, a clear correlation is observed between changes in lithology and changes in the slope of the CUMSUM signal 62. For example, data subset indicated by numeral reference 521 corresponds to a jumping point 621 in FIG. 6, and data subset indicated by numeral reference 522 corresponds to a jumping point 622 in FIG. 6. The slope of curve 62 considerably changes at the two jumping points 621 and 622, indicating a change of formation property is detected at the moments of time corresponding to numeral references 521 and 522.

In FIG. 5, the horizontal axis is the time axis, in the unit of second. The vertical axis indicates the gamma ray measurement such as a strength thereof, in the unit of GAPI (Gamma API). From data set 51 and curve 52, it is observed that the gamma ray signal detected by the first sensor 302 stays relatively stable until a sharp increase indicated by reference numeral 521, which is mainly because the first sensor 302 has entered a different formation layer which presents a different gamma ray emission. After 521, the gamma ray signal stays relatively stable again, which is mainly because the first sensor 302 stays in the new formation layer where the gamma ray signal fluctuates but does not dramatically change, until another considerable change as indicated by reference numeral 522.

FIG. 6 illustrates a cumulative sum curve derived based on the data shown in FIG. 5. Curve 62 is derived based on e.g., curve 52. In FIG. 6, the horizontal axis indicates time (in the unit of second (S)), the vertical axis indicates the CUSUM of value of detected gamma ray signal (e.g., strength thereof). The turning/jumping point 621 corresponds to data points around 521, turning/jumping point 622 corresponds to data appoints around 522. This means gamma ray detected by the first sensor really changes (or jumps) at/around the turning points 621 and 622. The turning points can be identified by e.g., a Matlab algorithm which will be further described. In FIGS. 5 and 6, the moment of time corresponding to turning point 621 is denoted as $T_1$, the moment of time corresponding to turning point 622 is denoted as $T_1'$.

For as long as the first sensor 302 remains within the same formation layer, the cumulative sum of the measured signal, see for example curve 62, yields a line with a relatively constant slope. As soon as the lithology changes, the slope of the CUSUM curve 62 changes as well, see for example the turning point 621 or 622.

There are several sources of noise in the detections of the first sensor 302, ranging from intrinsic noise associated to the random nature of the radiative process of the formation, to electronic noise due to the first sensor. Irrespective of its origin, noise introduces uncertainty and influences the accuracy of the calculated ROP values. To reduce the uncertainty in the calculated ROP values, an enhanced algorithm is developed with signal processing capabilities. The algorithm may adopt a Kalman filter, which does not smooth the transition point (unlike other filters) and thus allows a more accurate determination of the true moment in time when the gamma ray 302 really 'sees' a different formation layer. Thus, the values of property such as gamma ray detected by the first sensor 302 is preferably smoothed and then used to calculate the cumulative sum.

In an example, according to the algorithm which can be implemented in Matlab and used by the processing unit 508, the cumulative sum illustrated in FIG. 6 can be calculated based on the follow formulas:

$$\text{for } i=1, \text{CUSUM}(i) = \text{property}(i) - mu \quad (1)$$

$$\text{for } i>1, \text{CUSUM}(i) = \text{CUSUM}(i-1) + (\text{property}(i) - mu) \quad (2)$$

wherein i is a positive integer and is the serial number of values of the property detected by the first sensor 302, property (i) is the i-th value of the property detected by the first sensor (or the value of the i-th data point in FIG. 5), mu is an average of the values. Mu is an average of over all available data points at each step during the measurement. In practice, one would start monitoring the formation and a significant dataset will be collected before a change of the formation property is observed. This gives enough data to calculate mu and CUSUM. For the first CUSUM point, mu can be calculated as $$\frac{(0 + \text{property}(1))}{2},$$

i.e., half the value of the first detected gamma ray signal.

The processing unit 308 determines a change of the formation property is detected at the moment in time when property (i) is detected if $$\text{CUSUM}(i+2) > \text{CUSUM}(i+1) \text{ and } \text{CUSUM}(i+1) \leq \text{CUSUM}(i) \quad (3)$$

or $$\text{CUSUM}(i+2) \leq \text{CUSUM}(i+1) \text{ and } \text{CUSUM}(i+1) > \text{CUSUM}(i) \quad (4)$$

Results obtained during a yard test designed to mimic a drilling operation have been successfully used to prove the feasibility of the CUSUM-based method to determine whether a change of the formation property is detected.

FIG. 4 shows an exemplary flowchart of a method for downhole measurement during operation of a drilling system according to an embodiment of the invention.

The method 40 comprises the following steps, typically performed in the following order:

Step 400 (optional): determining whether the first sensor 302 shall detect the gamma ray in the formation.

This can be done by monitoring the weight-on-bit (WOB) and rotation round-per-minute (RPM) of the drill bit 104. If the drill bit is not rotating, or the WOB is too low, the first sensor 302 may wait and do not start the detection. In an example, the monitoring of WOB and RPM of the drill bit may be continuous, so for example if the drill bit stops rotating, the first sensor 302 may stop detecting the gamma ray because the drill bit is not advancing. If the result of step 400 confirms bit rotation, then the method proceeds to step 402.

Step 402: A property of the formation such as gamma ray is detected by the first sensor 302 in this step, as previously mentioned with reference to the apparatus 30.

Step 404: In step 404, while the first sensor 302 is detecting the gamma ray of the formation, the processing unit 308 receives gamma ray detections from the first sensor 302 and determines if a change of the gamma ray is detected, as previously mentioned. If a change is detected, the method proceeds to step 406, otherwise it may repeat step 404.

Step 406: A change of gamma ray is detected by the first sensor 302, so the radiation source 304 gets triggered in this step to emit radiation such as neutron radiation to a part of the formation so as to excite that part of the formation, as previously mentioned. The method 40 then proceeds to step 408.

Step 408: The second sensor 406 is able to detect the part of formation that has been excited by the radiation source 304 in step 406. If the excited part of formation is detected, the method proceeds to step 410, otherwise the step 408 is repeated. As previously mentioned, the second sensor 406 may be formed as a gamma ray sensor to detect the excited part 220 by detecting gamma ray emitted by the part 220, or be formed as a neutron sensor to detect neutrons left in the part 220 by the radiation source 304.

Step 410: the processing unit 308 calculates a rate of penetration of the drill bit, after the excited part of formation is detected, based on the following: a time duration T between the radiation source is triggered and the excited part of formation is detected, and the distance L between the radiation source 304 and the second sensor 306. L is fixed and known, T can be easily measured by a timer.

The present disclosure is not limited to the embodiments as described above and the appended claims. Many modifications are conceivable and features of respective embodiments may be combined.

What is claimed is:

1. An apparatus for downhole measurement during operation of a drilling system, the apparatus comprising:
    a first sensor configured to detect a property of a subsurface formation;
    a radiation source configured to, when triggered, emit radiation to excite a part of the formation;
    a processing unit configured to trigger the radiation source if a change of the property of the formation is detected;
    a second sensor positioned at a known distance from the radiation source and operably connected to the processing unit, the second sensor is configured to detect said excited part of the formation and is more distant from a drill bit of the drilling system than the radiation source is;
    the processing unit is further configured to, after the excited part of the formation is detected, calculate a rate of penetration of the drill bit based on the following: a time duration between the radiation source is triggered and the excited part of formation is detected, and the distance between the radiation source and the second sensor.

2. The apparatus of claim 1, wherein the radiation source is more distant from the drill bit than the first sensor is.

3. The apparatus of claim 1, wherein the processing unit is configured to calculate a cumulative sum (CUSUM) of the property of the formation, and trigger the radiation source if the cumulative sum indicates a change of the property.

4. The apparatus of claim 3, wherein values of the property detected by the first sensor is smoothed and then used to calculate the cumulative sum.

5. The apparatus of claim 3, wherein the cumulative sum is calculated based on the following formulas:

for $i=1, \text{CUSUM}(i) = \text{property}(i) - mu$, for $i>1, \text{CUSUM}(i) = \text{CUSUM}(i-1) + (\text{property}(i) - mu)$, wherein i is a positive integer and is the serial number of values of the property detected by the first sensor, property (i) is the i-th value of the property detected by the first sensor, mu is an average of all available values of the property that have been detected.

6. The apparauts of claim 5, wherein the processing unit is further configured to determine that the property of the formation changes at the moment in time when property (i) is detected if:

$\text{CUSUM}(i+2) > \text{CUSUM}(i+1)$ and $\text{CUSUM}(i+1) \leq \text{CUSUM}(i)$ or if $\text{CUSUM}(i+2) \leq \text{CUSUM}(i+1)$ and $\text{CUSUM}(i+1) > \text{CUSUM}(i)$.

7. The apparatus of claim 1, wherein the property of the formation detected by the first sensor includes at least one of the following:
radiation,
density,
sound velocity.

8. A drilling system comprising an apparatus for downhole measurement during operation of a drilling system, the apparatus comprising:
a first sensor configured to detect a property of a subsurface formation;
a radiation source configured to, when triggered, emit radiations to excite a part of the formation;
a processing unit configured to trigger the radiation source if a change of the property of the formation is detected;
a second sensor positioned at a known distance from the radiation source and operably connected to the processing unit, the second sensor is configured to detect said excited part of the formation and is more distant from a drill bit of the drilling system than the radiation source is
the processing unit is further configured to, after the excited part of the formation is detected, calculate a rate of penetration of the drill bit based on the following: a time duration between the radiation source is triggered and the excited part of formation is detected, and the distance between the radiation source and the second sensor.

9. A method for downhole measurement during operation of a drilling system, comprising:
detecting a property of a subsurface formation;
determining if a change of the property of the formation is detected;
if a change of the property of the formation is detected, triggering a radiation source to emit radiation to a part of the formation to excite said part of the formation;
detecting said excited part of formation with a sensor which is positioned at a known distance L from the radiation source and is more distant from a drill bit of the drilling system than the radiation source is;
calculating a rate of penetration of the drill bit, after the excited part of formation is detected, based on the following: a time duration between the radiation source is triggered and the excited part of formation is detected, and the distance between the radiation source and the sensor.

10. The method of claim 9, wherein the radiation source is more distant from the drill bit than the first sensor is.

11. The method of claim 9, wherein determining if a change of the property of the formation is detected comprising:
calculating a cumulative sum (CUMSUM) of the property of the formation, and
determining if the cumulative sum indicates a change of the property of the formation.

12. The method of claim 11, wherein values of the property detected by the first sensor is smoothed and then used to calculate the cumulative sum.

13. The method of claim 11, wherein the cumulative sum is calculated based on the follow formulas:

for $i=1, \text{CUSUM}(i) = \text{property}(i) - mu$, for $i>1, \text{CUSUM}(i) = \text{CUSUM}(i-1) + (\text{property}(i) - mu)$, wherein i is a positive integer and is the serial number of values of the property detected by the first sensor, property (i) is the i-th value of the property detected by the first sensor, mu is an average of all available values of the property that have been detected.

14. The method of claim 13, wherein determining if the cumulative sum indicates a change of the property comprising:
determining that the property of the formation changes at the moment in time when property (i) is detected if:

$\text{CUSUM}(i+2) > \text{CUSUM}(i+1)$ and $\text{CUSUM}(i+1) \leq \text{CUSUM}(i)$ or if $\text{CUSUM}(i+2) \leq \text{CUSUM}(i+1)$ and $\text{CUSUM}(i+1) > \text{CUSUM}(i)$.

15. The method of claim 9, wherein the property of the formation includes at least one of the following:
radiation,
density,
sound velocity.

* * * * *